US011055764B2

(12) United States Patent
Kounine et al.

(10) Patent No.: US 11,055,764 B2
(45) Date of Patent: Jul. 6, 2021

(54) SYSTEMS AND METHODS FOR PROVIDING PERSONALIZED ONLINE CONTENT

(71) Applicant: Selligent, S.A., Braine-l'Alleud (BE)

(72) Inventors: Alexei Kounine, Braine-l'Alleud (BE); Christopher Burger, Braine-l'Alleud (BE)

(73) Assignee: Selligent, S.A., Braine-l' Alleud (BE)

( * ) Notice: Subject to any disclaimer, the term of this patent is extended or adjusted under 35 U.S.C. 154(b) by 169 days.

(21) Appl. No.: 16/261,426

(22) Filed: Jan. 29, 2019

(65) Prior Publication Data

US 2019/0236680 A1 Aug. 1, 2019

Related U.S. Application Data

(63) Continuation of application No. PCT/US2019/015702, filed on Jan. 29, 2019.

(Continued)

(51) Int. Cl.

*G06F 17/16* (2006.01)
*G06N 5/02* (2006.01)

(Continued)

(52) U.S. Cl.

CPC ......... *G06Q 30/0631* (2013.01); *G06F 17/16* (2013.01); *G06N 5/02* (2013.01);

(Continued)

(58) Field of Classification Search

None

See application file for complete search history.

(56) References Cited

U.S. PATENT DOCUMENTS 8,095,521 B2 1/2012 Chan et al.
8,566,256 B2 * 10/2013 Hueter .................. H04L 51/12 706/12

(Continued)

OTHER PUBLICATIONS

Lu, S., et al., Graph-Based Collaborative Filtering with MLP, Mathematical Problems in Engineering, vol. 2018, Article ID 8314105, ten pages, https://doi.org/10.1155/2018/8314105. (Year: 2018).*

(Continued)

*Primary Examiner* — Nicholas D Rosen
(74) *Attorney, Agent, or Firm* — Crowell & Moring LLP

(57) ABSTRACT

A system for providing online-content includes a data-acquisition module configured to collect user data and product data. A configuration module determines a predictive algorithm and one or more filters based on received marketer-input. A recommendation engine generates recommendations in real-time, in response to a request. The recommendations are generated via the predictive algorithm, which generates scalar scores from the dot-product multiplication of at least one user-vector and at least one product-vector, the scalar score indicating the likelihood that a desired interaction will occur between the user and the product. The algorithm also determines a hierarchical list based on the scalar scores, and applies the filters to the hierarchical list so as to identify the recommendations. The recommendation engine can generate recommendations in two ways: recommend items based on users, and recommend users based on items. A rendering module generates a recommendation block based on the recommendations, which is transmitted to a user-computer in response to the request.

18 Claims, 12 Drawing Sheets

Related U.S. Application Data

(60) Provisional application No. 62/623,456, filed on Jan. 29, 2018.

(51) Int. Cl.
*G06Q 30/02* (2012.01)
*G06Q 30/06* (2012.01)

(52) U.S. Cl.
CPC ..... *G06Q 30/0633* (2013.01); *G06Q 30/0643* (2013.01); *G06Q 30/0255* (2013.01)

(56) References Cited

U.S. PATENT DOCUMENTS

| | | | | |
|---|---|---|---|---|
| 9,324,028 | B1 | 4/2016 | Boshy et al. | |
| 9,336,297 | B2 | 5/2016 | Galitsky | |
| 9,633,367 | B2 * | 4/2017 | Minnis | G06Q 30/0269 |
| 9,836,545 | B2 * | 12/2017 | LuVogt | G06Q 30/02 |
| 9,904,930 | B2 * | 2/2018 | Ogawa | G06Q 30/0242 |
| 10,073,822 | B2 * | 9/2018 | Goyal | G06Q 30/0242 |
| 10,102,307 | B2 * | 10/2018 | Han | G06F 16/9535 |
| 10,380,209 | B2 * | 8/2019 | Manning | G06F 16/435 |
| 2009/0063383 | A1 * | 3/2009 | Beaulieu | G06N 5/025 706/47 |
| 2009/0248599 | A1 | 10/2009 | Hueter et al. | |
| 2012/0158485 | A1 * | 6/2012 | Ogawa | G06Q 30/0242 705/14.42 |
| 2012/0290399 | A1 | 11/2012 | England et al. | |
| 2013/0290110 | A1 * | 10/2013 | LuVogt | G06F 16/9535 705/14.66 |
| 2014/0032359 | A1 | 1/2014 | Dewangan | |
| 2014/0108316 | A1 | 4/2014 | Goldman | |
| 2014/0207580 | A1 * | 7/2014 | Minnis | H04L 67/22 705/14.66 |
| 2014/0245337 | A1 * | 8/2014 | Gildfind | H04N 21/44222 725/16 |
| 2014/0280214 | A1 * | 9/2014 | Han | G06F 16/9535 707/748 |
| 2016/0110794 | A1 | 4/2016 | Hsiao et al. | |
| 2016/0217374 | A1 * | 7/2016 | Volkovs | H04N 21/4661 |
| 2017/0031919 | A1 * | 2/2017 | Manning | G06F 16/435 |
| 2017/0287044 | A1 * | 10/2017 | Rose | H04L 67/306 |
| 2017/0322917 | A1 * | 11/2017 | Goyal | G06Q 30/0242 |
| 2018/0144397 | A1 * | 5/2018 | Wilkinson | G06Q 20/102 |

OTHER PUBLICATIONS

PCT/US19/15702, International Search Report (PCT/ISA/210 and PCT/ISA/220) dated Apr. 16, 2019, enclosing Written Opinion of the International Searching Authority (PCT/ISA/237) (Eight (8) pages).
PCT/US2019/015702, International Preliminary Report on Patentability (PCT/IB/326 and PCT/IB/373) dated Aug. 13, 2020 (Six (6) pages).

* cited by examiner

300

400

410

SYSTEMS AND METHODS FOR PROVIDING PERSONALIZED ONLINE CONTENT

CROSS REFERENCE TO RELATED APPLICATIONS

This application is a continuation of PCT/US2019/15702, filed on Jan. 29, 2019, which claims priority to U.S. Provisional Appl. No. 62/623,456, filed on Jan. 29, 2018, the entire contents of which are hereby expressly incorporated by reference.

FIELD OF THE INVENTION

The present invention relates to computer and internet technology, namely, systems and methods for providing personalized online content.

BACKGROUND OF THE INVENTION

Problems exist in modifying/altering websites and emails (or other electronic communications) in real-time to make them more relevant and personalized to each individual consumer who visits the website or receives the email. Indeed, most electronic communications and webpages provide the same content to all users and it is a challenge for digital marketing professionals to modify/alter these websites and emails (or other electronic communications) in real-time to make them more relevant to individuals who interact with this content. Traditionally marketers tend to divide users into manually defined segments, according to which content is about to be sent. Users of one segment are provided with some content, whereas users of another segment are provide with other content.

Targeted online content distribution refers to the technology of personalizing online content to its percipient user, such as, for example, a website visitor or email recipient. It is often utilized to create dynamically personalized, highly relevant online experiences based on user profiles. Targeted online content distribution is a technology based on the idea that the same content will not resonate with everyone at every time, and that this non-homogeneity may have far reaching consequences affecting that resonance. For example, it makes little sense to provide geographically localized content to website users located elsewhere—and doing so may cause the user to switch to a website with content more relevant to him/her. As another example, it makes little sense to send an advertisement email to a user who is unlikely to purchase the advertised product.

Some examples of systems that utilize specific algorithms to generate personalized product recommendations are: U.S. Pat. No. 9,336,297 (Content Inversion for User Searches and Product Recommendations Systems and Methods); U.S. Pat. No. 8,095,521 (Recommendation System with Cluster-Based Filtering of Recommendations); US 2016/0110794 (Large-Scale Recommendations for a Dynamic Inventory); US 2016/0110794 (E-Commerce Recommendation System and Method); US 20140108316 (Augmenting Recommendation Algorithms Based on Similarity Between Electronic Content); US 2014/0032359 (System and Method for Providing Intelligent Recommendations); U.S. Pat. No. 9,324,028 (Collaborative Filtering of Content Recommendations). Each of these approaches is insufficient. None of these approaches provides a system in which the marketer utilizes a graphical user interface to easily control the system configuration via a mix of rule-based and machine-learning based algorithms. And none of these approaches solves the two key problems of personalization in one single system which has the general goal of optimizing a metric defined by the marketer (e.g., the conversion rate), those two key problems being: determining the optimal content for any user, and determining the optimal group of user for a specific content item.

Several challenges inhibit providing real-time content personalization on the individual user level. Most website users visit very few pages, which can render the user browsing history noisy and difficult to analyze. Systems solely relying on machine-learning lack sufficient administrator control over what content goes where. Making predictions in real-time (e.g., as a webpage or email loads) for large numbers of users is also inherently difficult. And different channels (e.g., webpage, email, etc.) utilize different rendering constraints that must be taken into account. Finally, the personalization problem cannot always be solved by finding the right content for a specific user. It also happens often that a marketer has content which needs to be sent (e.g. a specific product needs to be promoted). In that case the personalization challenge is about finding the right users for (i.e., the ones who are the most likely to engage with) a piece of predefined content.

As such, there is a need in the art for systems and methods that do not suffer from these and other drawbacks.

SUMMARY OF THE INVENTION

Systems and methods for providing personalized online content are disclosed herein, which overcomes the above-noted and other shortcomings of the prior art.

A system for providing personalized online-content includes a data-acquisition module configured to collect user data and product data. A configuration module generates a predictive algorithm and one or more filters based on received marketer-input. A recommendation engine has the following functions: a) it generates product recommendations in real-time, in response to a request and/or b) it generates audience recommendations based on a category of products the marketer defines. The recommendations are generated via the predictive algorithm, which generates scalar scores from the dot-product multiplication of at least one user-vector and at least one product-vector, the scalar score indicating the likelihood that a desired interaction will occur between the user and the product The algorithm also determines a hierarchical list based on the scalar scores, and applies the filters to the hierarchical list so as to identify the recommendations. A rendering module generates a recommendation block based on the recommendations, which is transmitted to a user-computer in response to the request.

A method for providing personalized online-content includes collecting user data and product data. The method also includes determining a predictive algorithm and one or more filters based on received marketer-input. The method also includes generating recommendations in real-time, in response to a request. The recommendations are generated via the predictive algorithm, which generates scalar scores from the dot-product multiplication of at least one user-vector and at least one product-vector, the scalar score indicating the likelihood that a desired interaction will occur between the user and the product The algorithm also determines a hierarchical list based on the scalar scores, and applies the filters to the hierarchical list so as to identify the recommendations. The method further includes generating a recommendation block based on the recommendations, and transmitting the recommendation block to a user-computer in response to the request.

Accordingly, the systems and methods disclosed herein provide personalized online-content that is tailored to the individual user. Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

BRIEF DESCRIPTION OF THE DRAWINGS

The features, objects, and advantages of the present invention will become more apparent from the detailed description, set forth below, when taken in conjunction with the drawings, in which like reference characters identify elements correspondingly throughout.

DETAILED DESCRIPTION OF THE PREFERRED EMBODIMENTS

Figure 1:
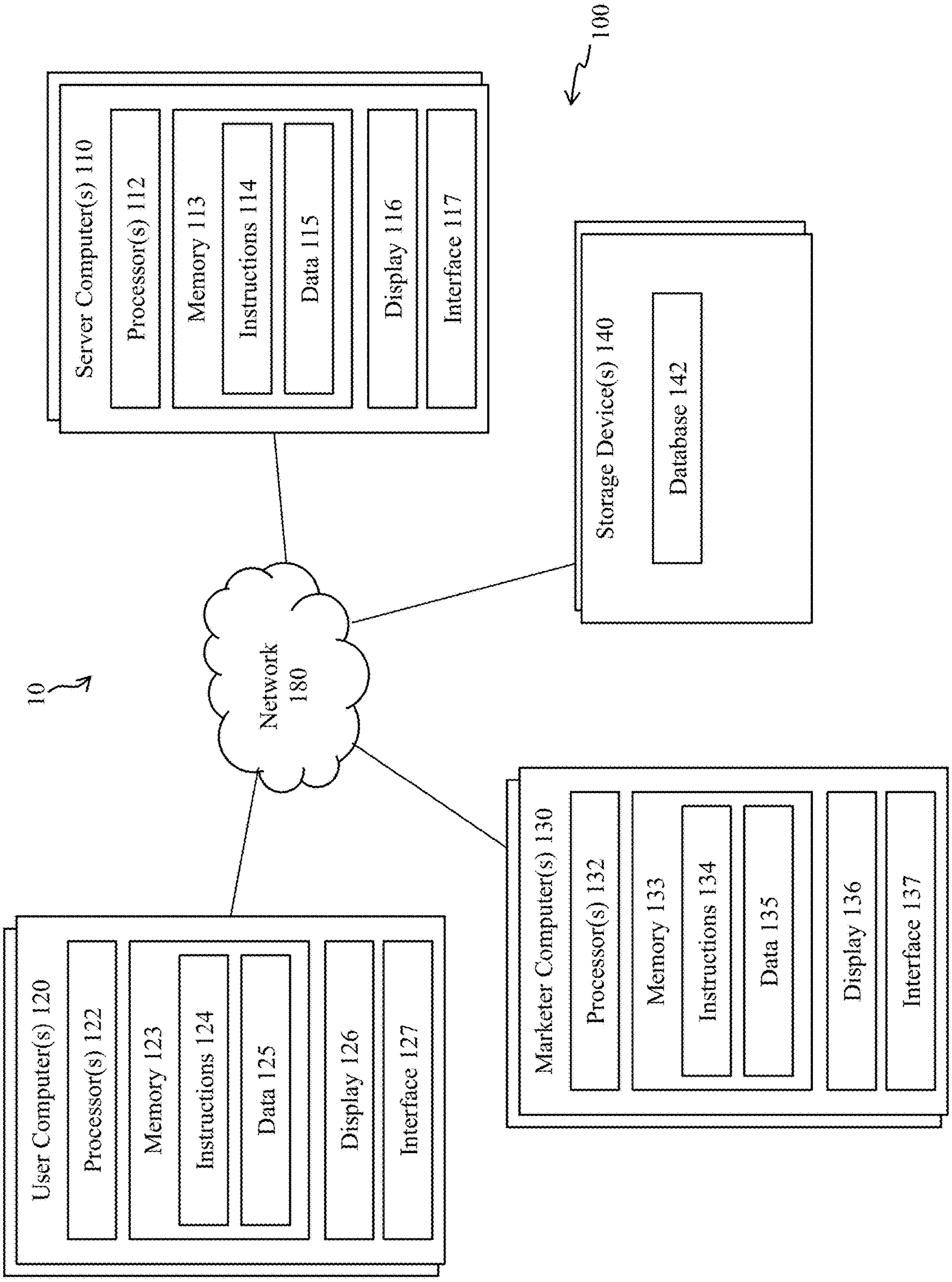
FIG. 1 illustrates a personalized online-content providing system in accordance with at least one aspect of the invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment.

Furthermore, the particular features, structures, or characteristics may be combined in any suitable manner on one or more embodiments without limitation. The term "or" as used herein is to be interpreted as inclusive or meaning any one or any combination.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, for brevity sake well-known methods, procedures, components, and circuits have not been described in detail.

The present invention generally relates to systems and methods for providing personalized online content.

FIG. 1 illustrates an exemplary personalized online-content providing system 10 in accordance with one or more aspects of the invention. In general, the personalized online-content providing system modifies webpage and/or electronic communication content, and/or recipients of the content, such that the content is relevant and personalized to each unique user (i.e., webpage visitor or electronic communication recipient).

The personalized online-content providing system comprises a server system 100 coupled to one or more user computers 120, a marketer computer 130, and a storage device 140 via a public network 180 (e.g., the Internet). The server system many include one or more server computer(s) 110 connected to the network. Each server computer 110 may include computer components, including one or more processors 112, memories 113, displays 116 and interfaces 117, and may also include software instructions 114 and data 115 for executing the functions of the server system 100 described herein.

The user computers 120 are user computing devices, which may include mobile (e.g., laptop computers, tablet computers, smartphones, PDAs, wearables, etc.) and stationary (e.g., desktop computers, etc.) devices connected to the network 180. Each user computer 120 may include computer components, such as one or more processors 122, memories 123, displays 126 and interfaces 127, and may also include software instructions 124 and data 125 for executing the functions of the user computer(s) 120 described herein. The marketer computer(s) 130 may similarly include computer components, such as one or more processors 132, memories 133, displays 136 and interfaces 137, and may also include software instructions 134 and data 135 for executing the functions of the marketer computer(s) 130 described herein.

The processor(s) 112, 122, 132 may instruct the respective computer components to perform various tasks based on the processing of information and/or data that may have been previously stored or have been received, such as software instructions and/or data stored in the memory(s) 113, 123, 133. The processor(s) 112, 122, 132 may be standard processor(s), such as a central processing unit (CPU), or may be dedicated processor(s), such as an application-specific integrated circuit (ASIC) or a field programmable gate array (FPGA), or a graphical processing unit (GPU).

The memory(s) 113, 123, 133 may store at least software instructions 114, 124, 134 and/or data 115, 125, 135 that can be accessed by the processor(s) 112, 122, 132. For example, the memory(s) 113, 123, 133 may be hardware capable of storing information accessible by the processor(s) 112, 122, 132, such as a ROM, RAM, hard-drive, CD-ROM, DVD, write-capable, read-only, etc. The set of instructions 114, 124, 134 may be included in software that can be implemented on the computer(s). It should be noted that the terms "instructions," "steps," "algorithm," and "programs" may be used interchangeably. The data 115, 125, 135 can be retrieved, manipulated or stored by the processor(s) 112, 122, 132 in accordance with the software instructions 114, 124, 134 or other sets of executable instructions. The data 115, 125, 135 may be stored as a collection of data.

Accordingly, the computer(s) 110, 120, 130 may include one or more respective software applications, stored in respective memory(s) 113, 123, 133, which software applications, when executed by the processor(s) 112, 122, 132 configures the computer(s) 110, 120, 130 to function as described herein. In particular, the user computing device(s) 120 may be configured to receive, view and/or otherwise access electronic content (e.g., webpage and/or electronic communication content) provided by the server computer(s) 110, and to send and/or receive data to and from the server computer(s) 110. This may include a web-browser displaying a web-page, an e-mail client within the web-browser and/or as a separate program, and/or a mobile software application.

The respective display(s) 116, 126, 136 may be any type of device capable of visually communicating data, such as a liquid-crystal display ("LCD") screen, a plasma screen, etc. The respective interface(s) 117, 127, 137 allow users to communicate with the computer(s) and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The server computer(s) 110 may be rack mounted on a network equipment rack and/or located, for instance, in a data center. In one example, the server computer(s) 110 may use the network 180 to serve the requests of programs executed on the user computing devices 120, marketer computers 130, the storage device 140 and/or other server computer(s) 110.

The storage device 140 may be configured to store large quantities of data and/or information, and may include one or more databases 142. For example, the storage device may be a collection of storage components, or a mixed collection of storage components, such as ROM, RAM, hard-drives, solid-state drives, removable drives, network storage, virtual memory, cache, registers, etc. The storage device 140 may also be configured so that the server computer(s) 110 may access it via the network 180.

The network 180 may be any type of network, wired or wireless, configured to facilitate the communication and transmission of data, instructions, etc. from one component to another component of the network. For example, the network 180 may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the configuration illustrated in FIG. 1 serves only as an example and is thus not limited thereto. The personalized online-content providing system 10, for instance, may include numerous other components, or more than one of each component, connected to network 180, and the network may be connected to other networks. As discussed, the personalized online-content providing system may be implemented via computer executed software. As such, the various functionalities of the personalized online-content providing system may be understood in terms of computer executed software modules in accordance with a system architecture.

Figure 2:
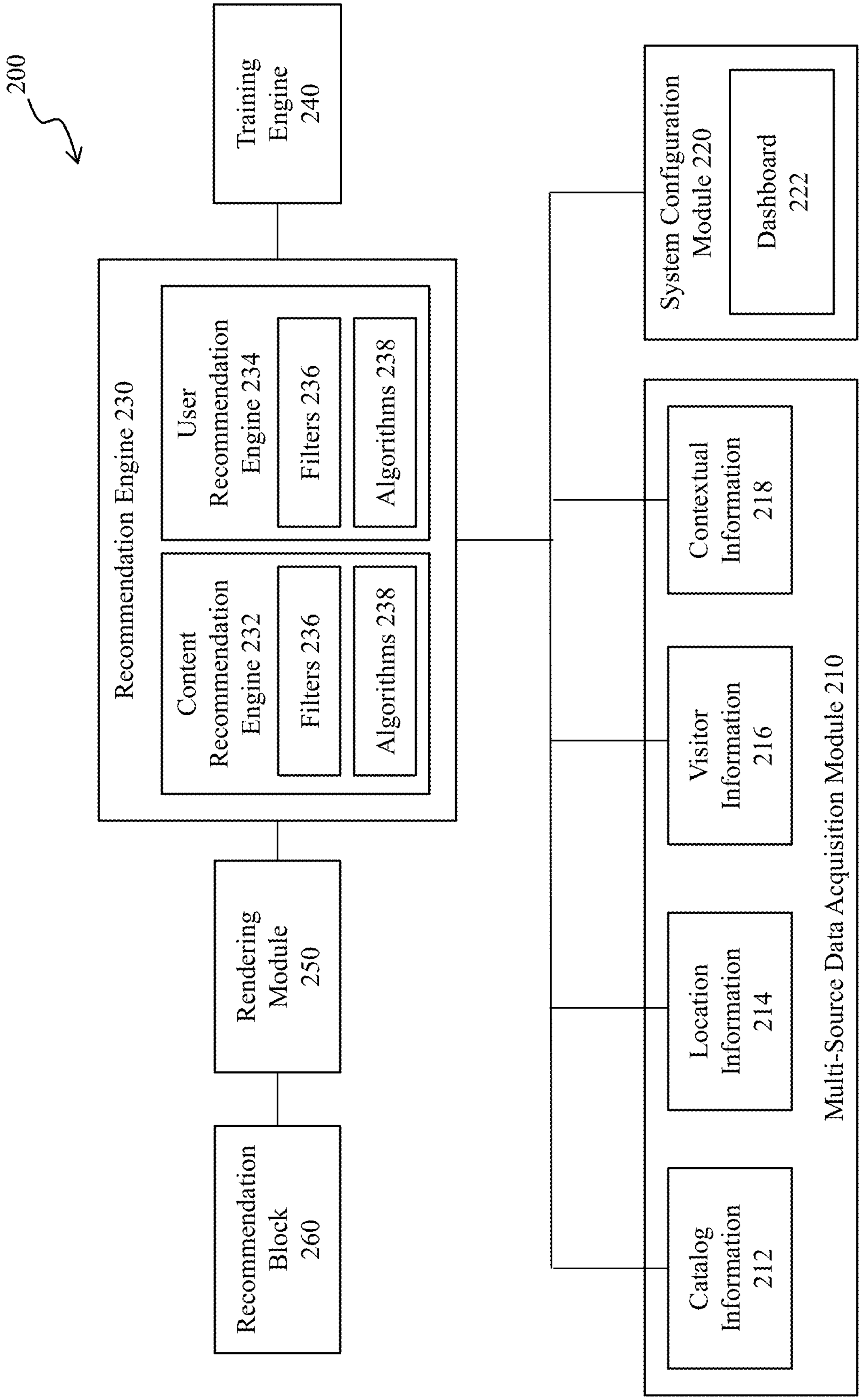
FIG. 2 illustrates an exemplary system architecture in accordance with at least one aspect of the invention.

FIG. 2 illustrates an exemplary system architecture 200 for providing personalized online content in accordance with at least one aspect of the invention. In general, the system architecture 200 provides for the modification of webpage and/or electronic communication content, and/or the recipients of the content, such that the content is relevant and personalized to each unique user (i.e., webpage visitor or electronic communication recipient). The user may be an anonymous user, or may be a known user (e.g., a logged-in user).

The system architecture 200 may be generally configured to provide personalized content recommendations and/or user recommendations. In particular, the system architecture 200 may be configured to make real-time recommendations based on several different configuration options and data types, including, consumer anonymous behavioral data (e.g., clickpath data), consumer personal data (e.g., gender, name, location, preferences, etc.), catalog data (e.g., color, category, price, URLs, etc.), business logic input by the marketer, and algorithm(s) configured by the marketer. As used herein, the term "recommendations" refers to: a) electronic content provided to the user in the form of a suggestion, as is the case during online shopping when additional items (and related content) are presented to a customer in a "you may also be interested in" portion of the webpage, and/or b) a set of users likely to have an affinity for electronic content defined by the marketer. While the system is described herein with reference to recommendations as exemplary content, it will be understood that the principles of the invention may be applied to other types of content.

The system architecture 200 may be configured to support a marketer-controlled platform and and for the marketer to control different aspects of the system and/or platform, including, applying different machine learning and statistics based approaches in different situations. The platform may include: (1) a mix of data-driven algorithms and hand-crafted business logic in real-time algorithms; (2) marketer-oriented simple user-interface to configure complex math; and (3) complex real-time system with the code/model updates and other complexities hidden from the marketer.

As illustrated, for example, in FIG. 2, the system architecture 200 may include several functional modules or engines, including a multi-source data acquisition module 210; a system configuration module 220; a recommendation engine 230, including a content recommendation module 232 and/or a user recommendation module 234; an training engine 240; and a channel-specific rendering module 250.

In general, the system architecture 200 configures the system to utilize product and user related data acquired from multiple sources to predict the most relevant content for each user via the content recommendation module 230, and to predict the most relevant users for each content via the content recommendation module 230. In the first case the content recommendations are utilized to provide content to the user(s) such that each user is provided with personalized content recommended for that user. In the second case, the user recommendations are provided to the marketer to be used in a campaign such that the same content is provided to each of the recommended users. Providing user(s) with content may be done via a recommendation block 260, which may be in response to a request, or which may be pushed to identified users.

Multi-Source Data Acquisition Module:

Referring to FIG. 2, the multi-source data acquisition module is configured to collect various types of data from different sources, and to retrievably save the collected data in a database formed in the storage device. The collected data may be stored and utilized in the real-time display of the electronic content, e.g., product recommendations. As used herein, the term "product" refers not only to goods, but also to services and other subjects of the online content.

The types of data that is collected may include catalog information 212 (e.g., URL, images, prices, categories of products or articles), preferably product catalog information. The catalog information may be collected from brands and retailers (e.g., via advertising and/or marketplaces) and by publishers (e.g., via RSS feeds). The catalog information may be provided in one or more data files, and according to various standard formats (e.g., CSV, XML, JSON, etc.).

Location related information 214 may also be provided and/or generated from the catalog information. The location information may, for example, indicate for each product, the values of location-dependent product variables, including, for example, the product's availability, its associated price, the currency of the price, and the language at the location. For example, the location related information may indicate that a first product is sold at a first price in a first currency in a first country, but that it is sold at a second price in a second currency in a second country, and is not sold at all in a third country.

The collection of the data may be accomplished via batch data imports done at regular time intervals (e.g., once or twice per day), as is known in the art. Additionally or alternatively, real-time data collection, in particular data related to item availability, may be accomplished via an API configured to push data to the product catalog. It will be understood that the data collection may involve updating previously collected data to reflect changes occurring since the prior collection.

The collected data may also include visitor tracking data 216, whether anonymous or not. The visitor tracking data preferably takes the form of <user, item, action> tuples, which are stored in the memory via the recommendation engine. The "action" parameter can be any of "page visit", "click", "add-to-cart", "purchase", or actions that may be custom defined by the marketer via the system configuration module.

The collected data may further include contextual data 218, which may include the type of webpage or email the visitor is currently interacting with, as well as business logic affecting the content recommendation.

System Configuration Module:

Referring again to FIG. 2, the system configuration module 220 is generally configured to include a marketer facing dashboard 222 that permits a marketer to provide input for configuring the personalized online-content providing system. The dashboard 222 preferably permits the marketer to configure the behavior of the system by selecting different predictive algorithms 238 and creating business logic filters 236, as well as by customizing the online content to be provided and defining the content on which audience calculations described herein are based. The dashboard 222 further allows the marketer to control and fine-tune the behavior of the algorithms 238 via the creation of filters on catalog products, and enables users to build business logic into the system. The dashboard 222 allows the marketer to configure integrations with existing systems. For example, with respect to an import procedure of a product catalog feed from a Content Management System (CMS) (e.g., Magento, Wordpress, etc. . . . ) or Product Information Management System (PIM), the dashboard 222 allows the marketer to specify the files to be imported, the languages and locations of his websites and the mapping between field names (e.g. the "title" property would refer to the "NAME" column in the files to import). The predictive algorithms 238 are applied to generate the recommendation 250, as discussed herein.

Figure 3:
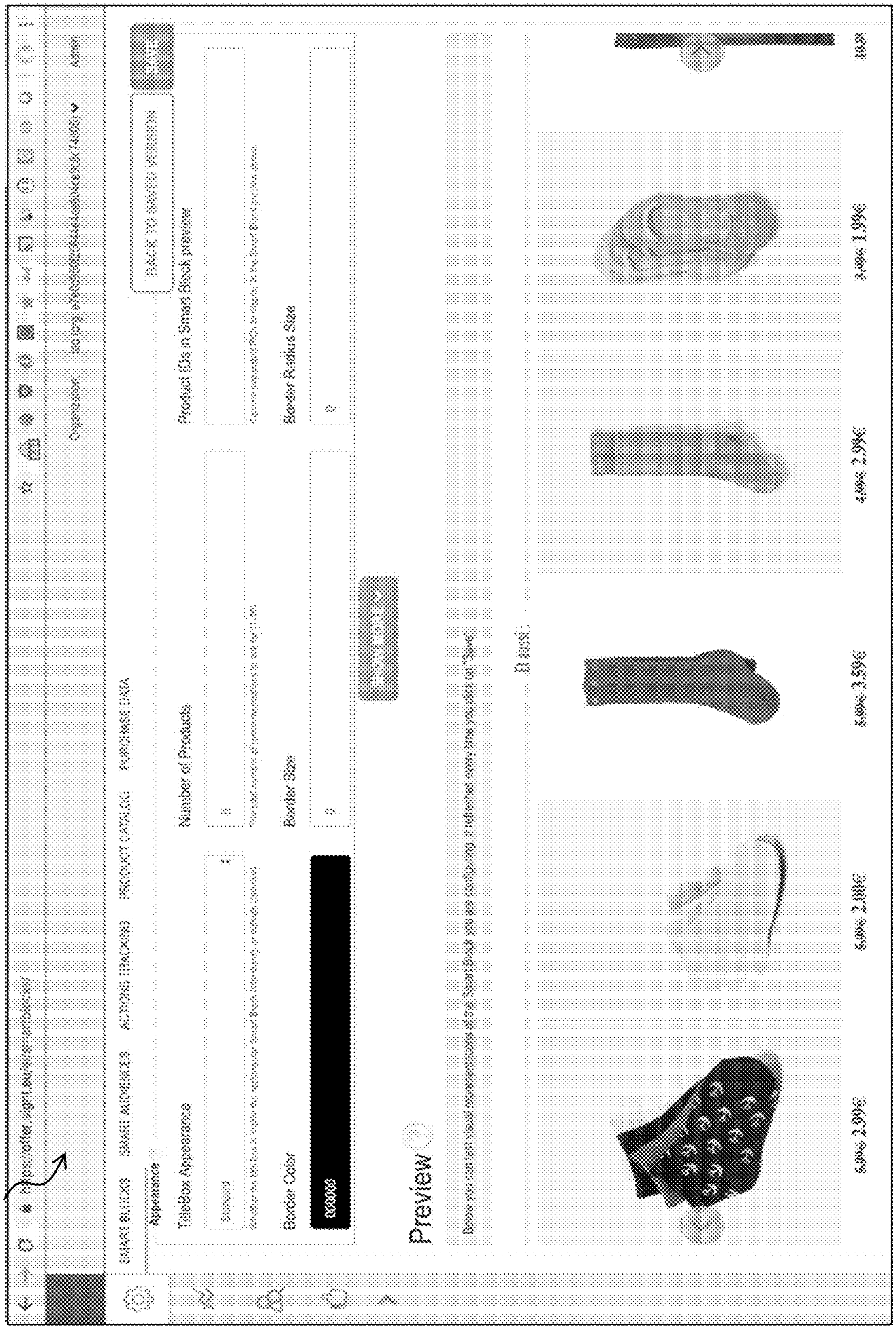
FIG. 3 is a screen shot illustrating aspects of an exemplary marketer facing dashboard in accordance with at least one aspect of the invention.

FIG. 3 is a screenshot 300 illustrating aspects of an exemplary marketer facing dashboard 222 that allows the marketer to configure the behavior of the system. The screenshot illustrates a dashboard interface available for the marketer to customize several aspects of the content recommendation engine 232 and the user recommendation engine 234. The interface is configured such that the marketer can choose from a list of algorithms, each of which optimizes a specific goal (conversion, discovery, promoting popular items, etc.). The algorithm can be further refined with business logic illustrated in FIG. 4A (e.g. exclusion of items in certain contexts and for certain users). These filters may be optional. The interface may be further configured such that the marketer can select the specific channel and graphics to be used for the block of recommendations the marketer is configuring. The bottom of FIG. 3 shows the final result of the recommendations block, which can be directly tested, via the graphical properties and recommendations being displayed for a specific user, in the dashboard 222.

Figure 4A:
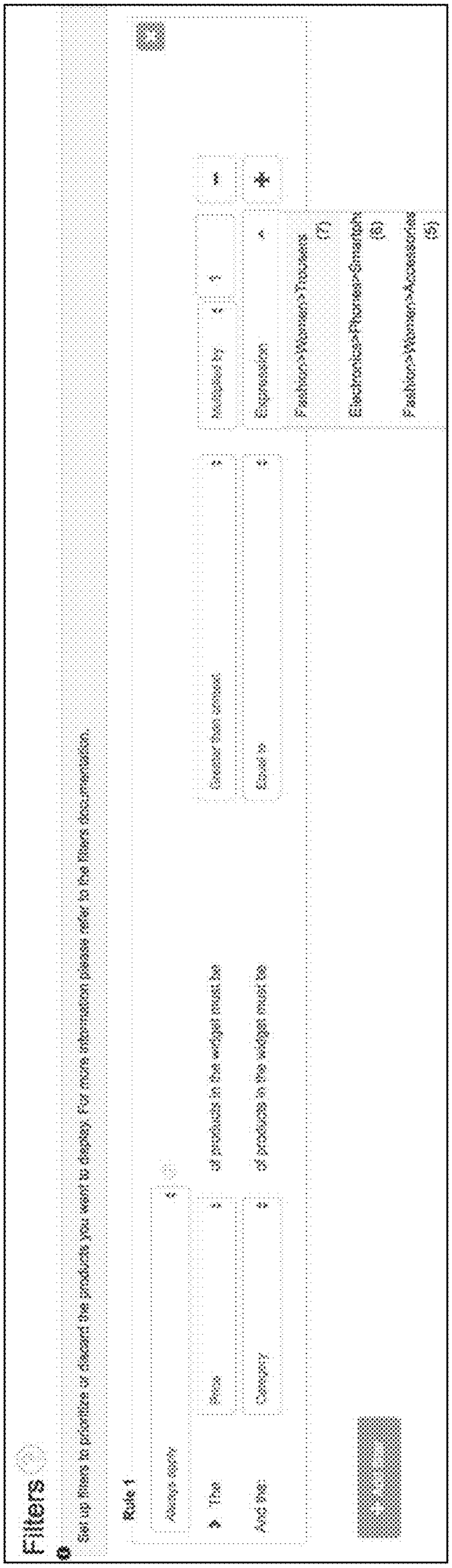
FIG. 4A is a screen shot illustrating additional aspects of the exemplary marketer facing dashboard in accordance with at least one aspect of the invention.
Figure 4B:
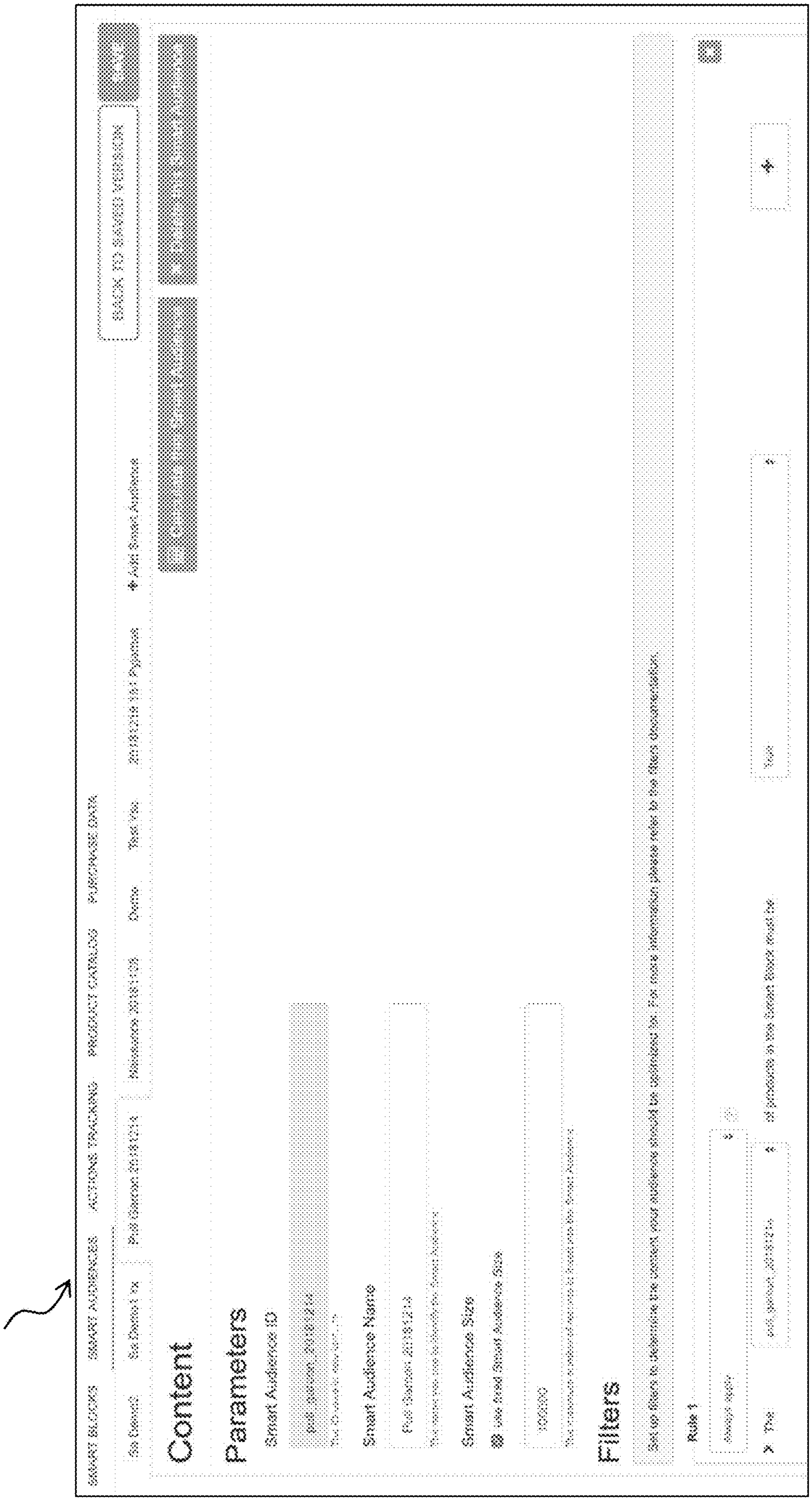
FIG. 4B is a screen shot illustrating additional aspects of the exemplary marketer facing dashboard in accordance with at least one aspect of the invention.

FIGS. 4A-4B illustrate additional screenshots, 400 and 410, respectively, which depict aspects of the exemplary marketer facing dashboard 222 that allows the marketer to configure the behavior of the system by creating various filters 236. The dashboard 222 may utilize an intuitive sentence-based filter generation interface, which allows any marketer to create complex business logic.

FIG. 4A illustrates a screenshot 400 of dashboard 222 in which various filters applicable for filtering product recommendations are provided, which filters are selected to be applied to the result of the algorithms 238. For example, a filter may be created that filters out any products within a certain category, excluding those products from being recommended to minors. The filtering system can be used to create several rules, each rule having multiple conditions (in which the rule is applied) and multiple category exclusions (based on the collected product data). The details on categories are automatically extracted as product data from the product catalog, which may be refreshed frequently and automatically. The configuration of the catalog import procedure is also performed by the marketer via the dashboard 222 when the system is initially configured.

FIG. 4B illustrates a screenshot 410 of dashboard 222 in which various filters 236 applicable for filtering audience recommendations are provided. The dashboard 222 may be configured to allow the marketer to configure the audience (i.e., set of users) by selecting an audience size, applying pre-filtering to the audience (e.g., removing opt-out contacts, contacts with missing PII data fields, etc.), and defining the content of the campaign the marketer wants to send. The latter may be done by identifying which category/categories of products, or which individual products represent the content of the campaign the best. This configuration may be done via a plurality of filters similar to the filters described in FIG. 4A for content recommendations. These filters can be applied on product data as well as on user data. User data includes both personal (PII) data and interaction data—e.g. "users who are male" or "users who visited at least five product pages in the past week."

Figure 5:
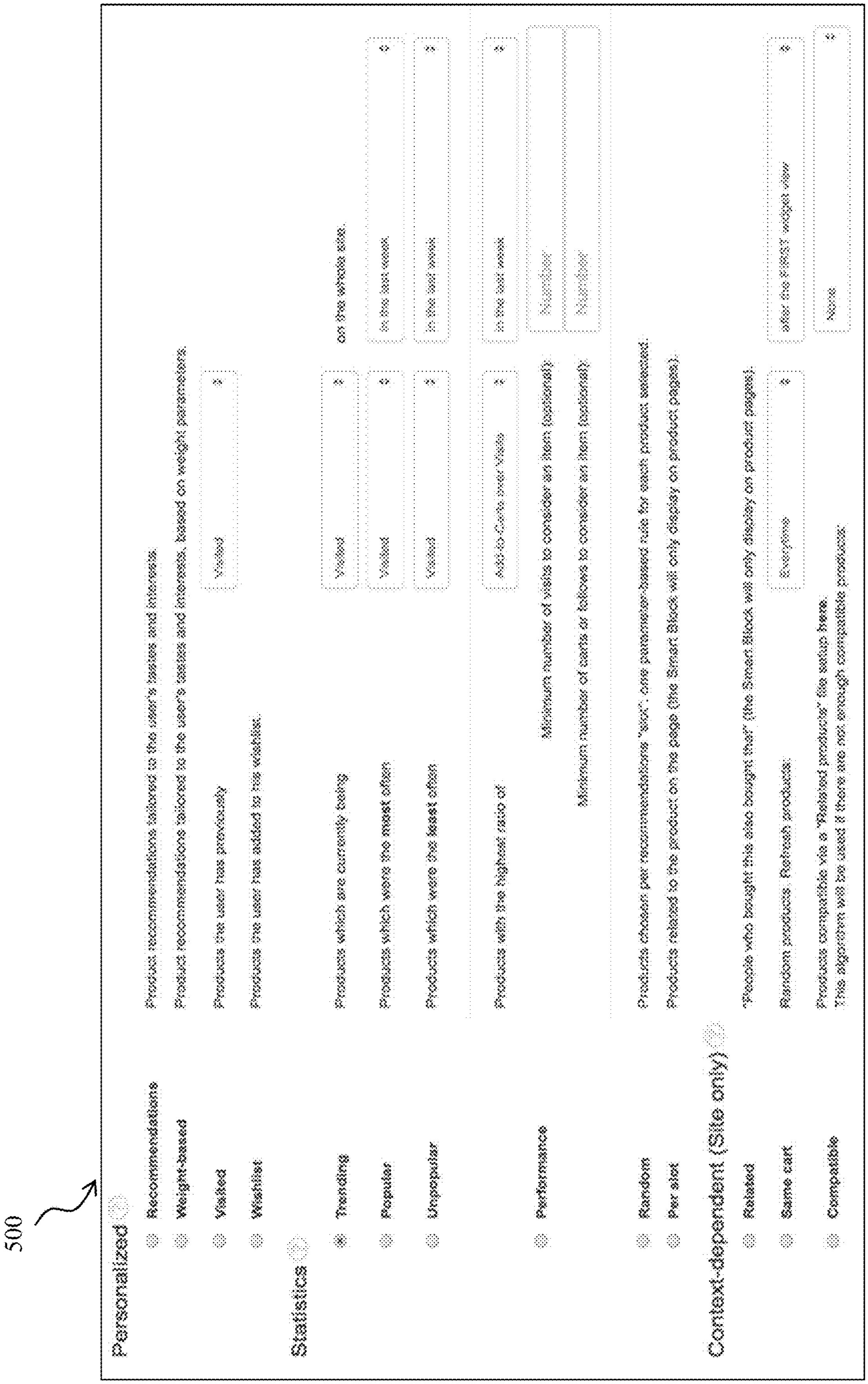
FIG. 5 is a screen shot illustrating additional aspects of the exemplary marketer facing dashboard in accordance with at least one aspect of the invention.

The dashboard 222 further permits the marketer to determine or otherwise configure predictive algorithms based on the business goals of the marketer. FIG. 5 illustrates a screenshot 500 depicting aspects of the exemplary marketer facing dashboard 222 that allows the marketer to configure the behavior of the system by selecting which algorithms 238 to apply. The configuration of algorithms 238 is preferably accomplished via a single click, and the effect on what is displayed in production is preferably nearly instantaneous. As such, there is little to no downtime, or system training required.

The predictive algorithms 238 may be determined from several categories, for example, personalized, statistics, and context-dependent categories. The personalized category may include: a recommendations algorithm, a weight-based algorithm, a visited algorithm, and a wish list algorithm. The recommendations algorithm may generate recommendations based on the user's tastes and interests. The weight-based algorithm may generate recommendations based on the user's tastes and interests and weight parameters. The visited algorithm may generate recommendations based on the user's visitation and/or access history. The wish list algorithm may generate recommendations based one or more wish lists of the user.

The statistics category may include: a trending algorithm, a popular algorithm, an unpopular algorithm, a performance algorithm, a random algorithm, and a per slot algorithm. The trending algorithm may generate recommendations based on substantially current visitation and/or access activity of multiple users. The popular and unpopular algorithms may generate recommendations based on historic visitation and/or access activity of multiple users. The performance algorithm may generate recommendations based on historic performance metrics (e.g., number of visits to a product webpage leading to placement of the product in a virtual shopping cart). The random algorithm may randomly use one or more other algorithms. The per slot algorithm may generate recommendations based on how many recommendations are to be provided.

The context-dependent category may include: a related algorithm, a same cart algorithm, and a compatible algorithm. The related algorithm may generate recommendations based on historical actions (e.g., purchases) of other users, which actions are related to some action or state of the user visiting the webpage (e.g., purchasing or viewing another product). The same cart algorithm may randomly provide recommendations upon predetermined periodic refreshing. The compatible algorithm may generate recommendations based on compatibility with the historical actions of other users.

Accordingly, the filters and business logic are represented via the dashboard 222 in an intuitive manner, which allows marketers to easily create and select the business rules and filters. It will be understood that the algorithms and filters described herein are merely illustrative. Any and all algorithms, filters and/or logic rules now known or hereinafter developed may be utilized by the system without departing from the scope of the invention.

Recommendation Engine:

Returning to FIG. 2, the recommendation engine 230 is generally configured to respond in real-time to item-selection requests incoming from various content vehicles, e.g., websites and/or emails. As previously discussed, the recommendation engine 230 may include: a content recommendation engine 232 and/or an audience recommendation engine 234.

Figure 6:
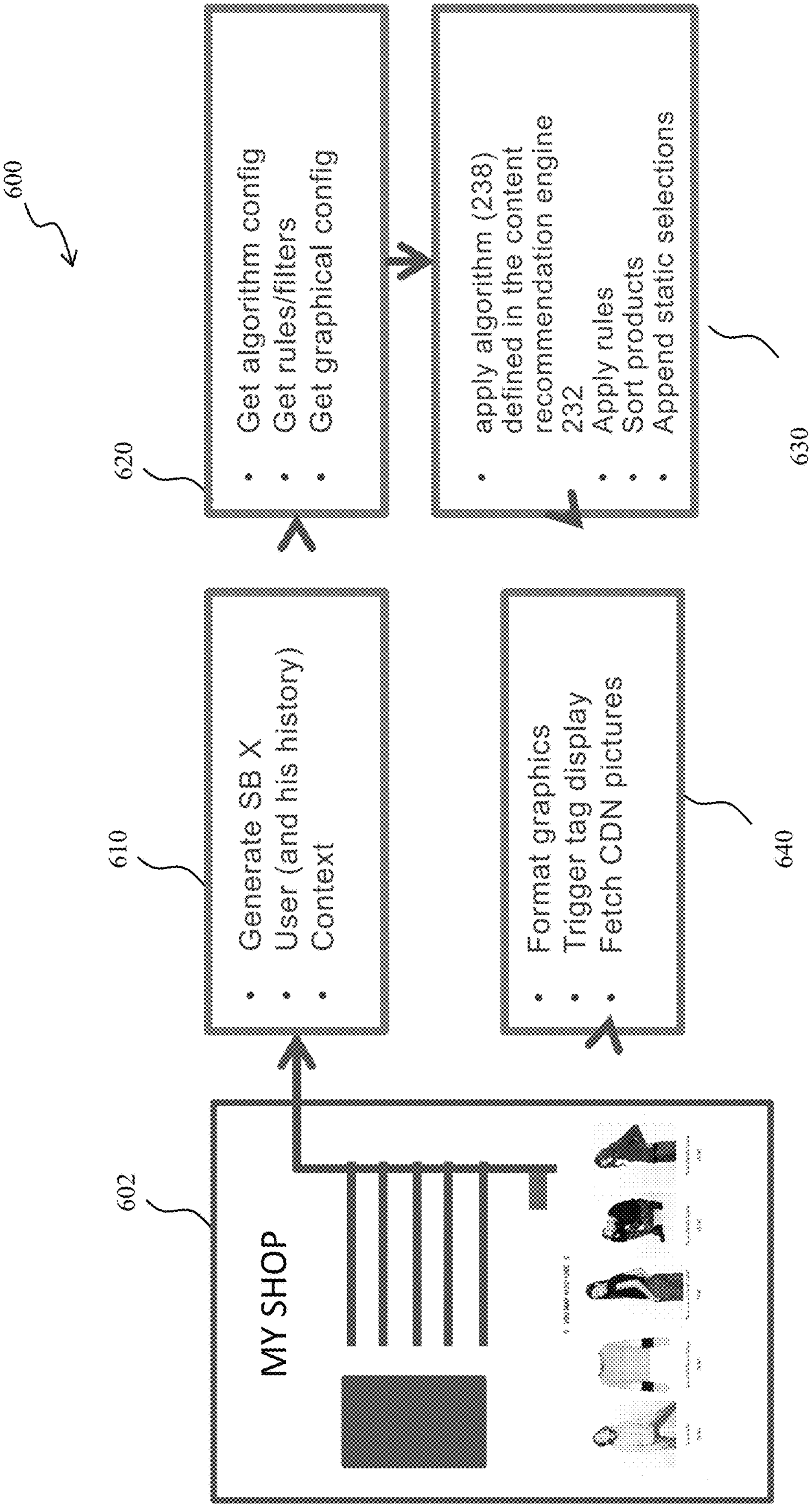
FIG. 6 illustrates an exemplary operation of the content recommendation engine in accordance with at least one aspect of the invention.

FIG. 6 illustrates a flowchart of an exemplary operation 600 of the content recommendation engine 232. In general, the content recommendation engine 232 automatically generates the recommendations to be provided to the user in response to a content request triggered via the user attempting to access a content vehicle 602, such as, e.g., a webpage or an e-mail.

At action block 610, the user accesses the content vehicle 602 (e.g., website, e-mail or mobile push notification), which triggers the loading of online-content provided by the server system 100. In particular, code embedded in the content vehicle 602 registers the user's attempt to access the content vehicle 602 and causes a request to be sent to the server system 100, the request being request for the recommended online-content to be loaded.

At action block 620, the server system 100 extracts user information, as collected data. The user information may be extracted based on unique identifiers, which may be stored in cookies on the user's browser for the case of websites, and in query parameters of the content call for email. A universal profile containing clickpath information, preferably anonymous, as well as richer personal data about the user may also be extracted, as further collected data. Such extraction may be from a global profile database in the storage device.

Based on the marketer's configuration of the system, the user may be classified into a segment based on user personal data. User personal data may include, for example, gender related data, e-mail related data, location related data, and/or aggregated statistics (e.g. webpage visitation history).

Depending on the segment the user is classified into, various user filters can be loaded to restrict recommendations. It will be understood that, where user personal data is not available, related filters are not applied, but that the process continues.

At action block 630, once the user filters are applied, one or more real-time predictive algorithms selected by the marketer are applied to generate the recommendation 260. The algorithms may be selected by the marketer via the dashboard from a plurality of predetermined algorithms. Alternatively, the algorithms may be generated by the marketer via the dashboard 222 from marketer input, e.g., business objectives and rules. The marketer is therefore able to select the algorithms that further or achieve a business objective (e.g. increase the general conversion rate, increase the number of products visited by each visitor, etc.).

The predictive algorithms use behavioral data of the user(s) along with the contextual data and product catalog information, each of which is loaded to the engine with the respective algorithm configuration, to generate the recommendation. These predictive algorithms may be applied in real-time. The output may be a list of recommendations (e.g., recommended products) sorted in a layout depending on the class and type of algorithm applied. The predictive algorithms may be written in a low-level language (e.g., C++). This has the benefits of direct access to memory, faster for-loops, and a reduced response time.

Figure 7:
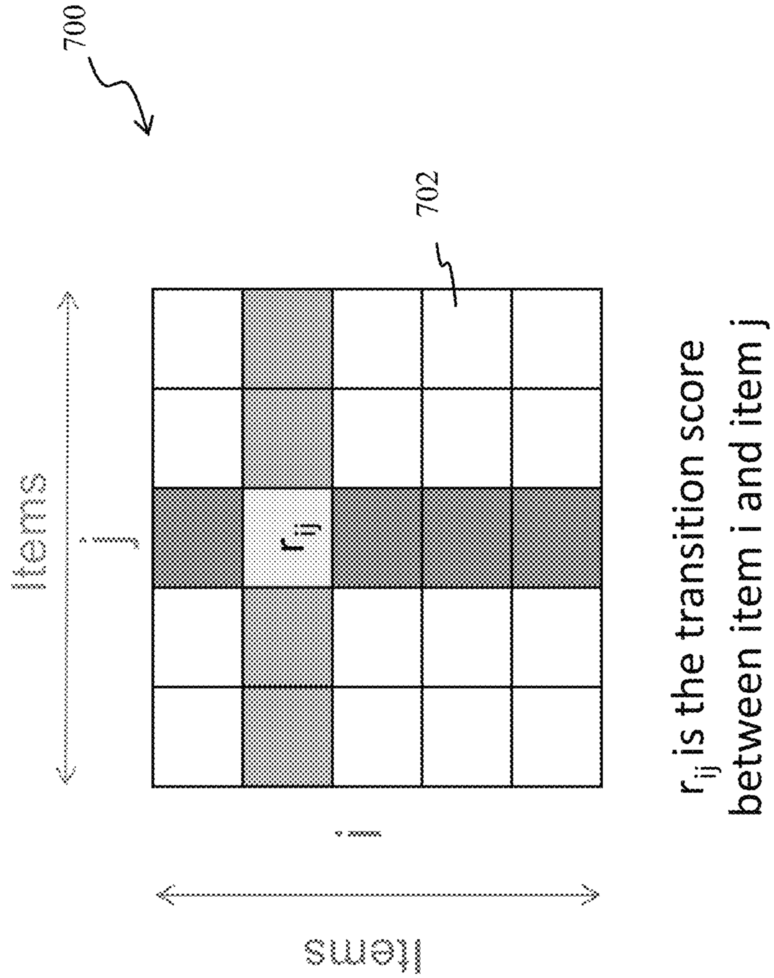
FIG. 7 illustrates an exemplary matrix utilized by the content recommendation engine in accordance with at least one aspect of the invention.

The predictive algorithms are based on mathematical models, where each user and each product may be represented as a vector of numbers, i.e. a representation of the user or product, according to a generated matrix. An exemplary matrix 700 is illustrated in FIG. 7.

The user and product vectors are generated via the training engine 230. The training process determines the respective product vectors for a plurality of items/products. The user vectors may be determined from the product vectors. Preferably, the product vectors are determined offline, i.e., not in real-time in response to a request, while user vectors are determined in in real-time in response to a request. The training process is preferably in accordance with ranking similarity learning techniques utilizing certain heuristics. An exemplary training process will now be described.

The matrix 700 is initialized with each of its cells 702 having zero values. Each time a user transitions from a web-page for product i to a web-page for product j (or does some other product transition action) a count value in cell $r_{i,j}$, i.e., count(i, j), is incremented. The matrix 700 is the input to the training procedure. In determining the vector representation for each product, the product vector for product i is vec(i), the product vector for product j is vec(j), and the dot-product between two product vectors is dot(vec (i), vec(j)). The training procedure preserves the ranking as best possible, and comprises the following:

The system checks whether count(i, j) is greater than count(i, k). If so, then the system checks whether dot(vec(i), vec(j)) is greater than dot(vec(i), vec(k)). If not, the system determines whether dot(vec(i), vec(k)) is greater than dot (vec(i), vec(j)) by more than a predetermined margin m, which is a selectable hyper-parameter. If so, the vectors are updated in accordance with the updating rules discussed herein.

The system also checks whether count(i, j) is less than count(i, k). If so, then the system checks whether dot(vec(i), vec(j)) is smaller than dot(vec(i), vec(k)). If not, the system determines whether dot(vec(i), vec(k)) is smaller than dot (vec(i), vec(j)) by more than the predetermined margin m. If so, the vectors are updated in accordance with the updating rules discussed herein.

The updating rules are as follows:

Update Rule 1: The column with the highest count should also have the highest dot-product compared to the other columns. For example, if: count(i, j)>count(i, x) for all x, then: dot(vec(i), vec(j)) should also be larger than all dot (vec(i), vec(x)) for all x within a first margin $m_1$. The product vectors are updated via a gradient descent step if this is violated.

Update Rule 2: For any two entries in the matrix 700 with non-zero values, if count(i, j)>count(i, k), then: dot(vec(i), vec(j)) should also be larger than all dot(vec(i), vec(k)) by at least a second margin $m_z$. The product vectors are updated via a gradient descent step if this is violated.

Update Rule 3: For an non-zero value count(i, j) and a zero value count(i, k), then: dot(vec(i), vec(j)) should also be larger than dot(vec(i), vec(x)), for all x, by at least a third margin $m_3$. The product vectors are updated via a gradient descent step if this is violated.

The user vectors are preferably weighted sums of product vectors associated with the user. In other words, the user vector for a first user is: $vec(u_1)=w_i(vec(i))+w_j(vec(j))+\ldots w_n(vec(n))$. The products associated with the user may be determined from the collected user data, e.g., browsing history. The contextual data may also be integrated into the user vector, as a weighted sum, as discussed herein.

The weights $w_n$ may be selected by the marketer to emphasize certain products, may be randomly selected, and/or may be selected according to any weighting scheme now known or later developed. In at least one embodiment, the weights $w_n$ are normalized for all associated items. Alternatively or additionally, the weighting scheme may be a time-dependent weighting scheme. For example, the longer the period since the user interacted with a product, the less weight the product may be given. Still further alternatively or additionally, the weighting scheme may be interaction-type dependent. For example, more weight may be attributed to products the user purchased than products whose web-pages the user visited without purchasing the product.

Accordingly, the content of each cell 702 is a scalar score $r_{i,j}$ representing the likelihood that the respective user will interact with (e.g., visit, click on, buy, etc.) the respective product. The dot-product, i.e., multiplication of the two vector representations, represents the score at each cell of the matrix.

Returning to FIG. 6, at action block 630, the selected algorithm is applied. In the case of the fully personalized algorithm, the real-time computation of the dot-products of the vector representations of the user who is accessing the webpage/e-mail 602 with the vector representations of each product that is potentially recommendable through the webpage/e-mail 602. The scores are then sorted from highest to lowest, the highest scores indicating the product having the highest likelihood of triggering the specific user interaction. This process is looped in real-time for all available products for all accessing users at every access (e.g., webpage load or e-mail retrieval). The use of dot product multiplication provides additional speed and efficiency to the process.

The contextual data 218 (e.g. the user is accessing a product webpage, or a checkout webpage for items in the virtual shopping cart, etc.) may also be considered here, as the contextual data 218 has a strong influence on scoring. For example, a user looking at a pair of shoes is very likely to be interested in shoes, while the same user (with the same history and behavior) landing on the home page of a site will probably want to see products tied to his buying habits.

The context information may be integrated into the user vector as described herein. By default the context information may be given equal weight to an interaction event between a user and a product. The contextual information can be given arbitrary weight. For example, a weight of 0 means that the context information is not taken into account at all, whereas a weight much larger than 1 means that the context information is given much more importance than the user's interaction history with products.

The business rules and filters 236 are also applied to all products as hard coded business logic: if a rule is set, the system should never go against it and select items which do not fulfill the rule. This logic goes inside the processing loop, as described herein. It will be understood that each filter on a large product catalog would typically be too resource intensive to consider, and would result in very long response times. The system avoids this problem by first computing the dot-products and then applying the filter-rules only on the results that have a high enough score to potentially be included in the recommendation.

In contrast to the content recommendation engine 232, the audience recommendation engine 234, in general, automatically determines a set of users to which predetermined content is recommended to be sent. The set of users determined by the audience recommendation engine 234 preferably becomes part of a marketing segment which the marketer will use to run a campaign on. The recommendation 260 is determined in substantially similar fashion to the operation of the content recommendation engine 232, except that the product vector is fixed and is dot-product multiplied by all the user vectors. The set of recommended users are those with the highest resulting scalar scores. The audience recommendation process also differs in that the filters 236 utilized are filters for filtering users from the dot-product results rather than filtering products.

Training Engine:

Returning to FIG. 2, the training engine 240 is configured to update the mathematical models used by the various algorithms when responding to requests. The training engine 240 may be run periodically, or on demand. In general, the training engine 240 finds the vector representations for the users and the products. This may occur offline and/or via separate server computer 110.

The training process involves several iterations of generating and solving the Item x Item matrix 700 discussed herein. The result of the training process is a binary file with the representations of all products. The representations of users are not saved to memory, as they are calculated in real-time at every request. The binary file is saved to the memory, and is read by each of the containers running for each marketer.

Figure 8:
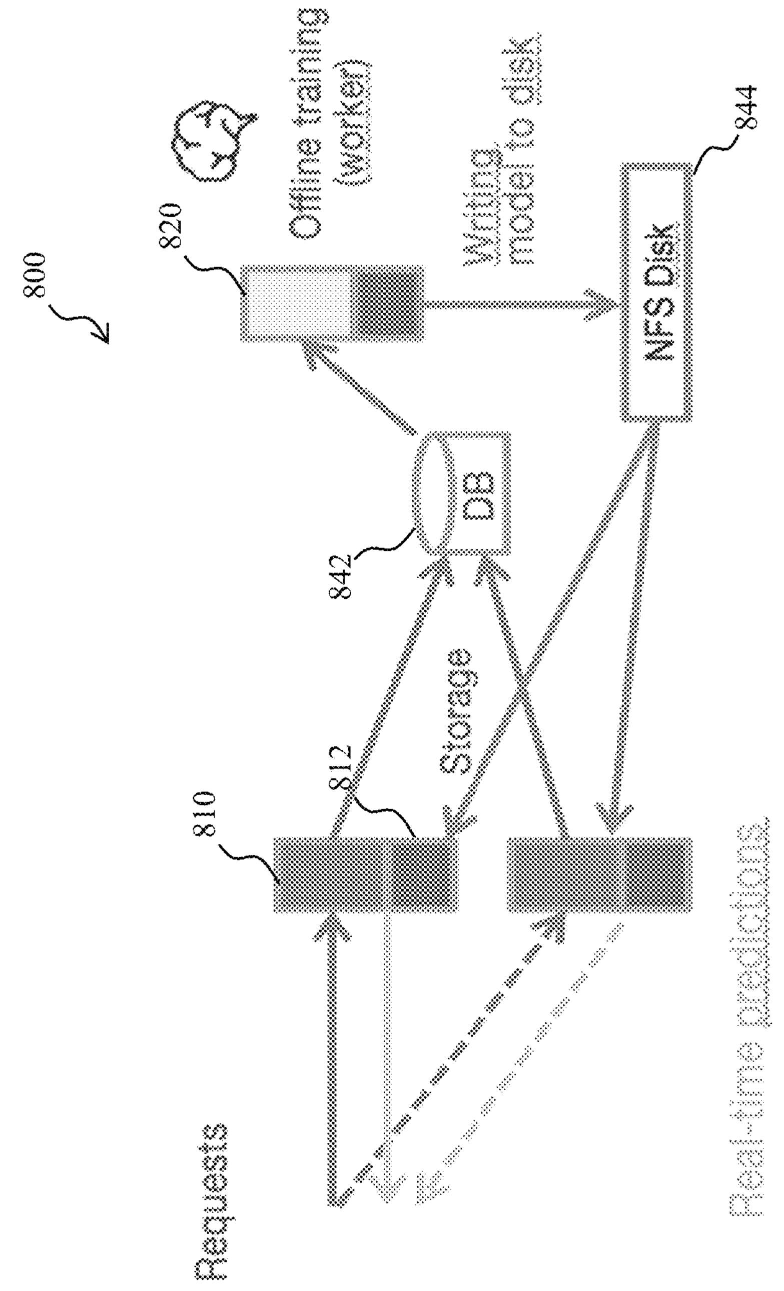
FIG. 8 illustrates aspects of an exemplary training process utilized by the training engine in accordance with at least one aspect of the invention.
Figure 9:
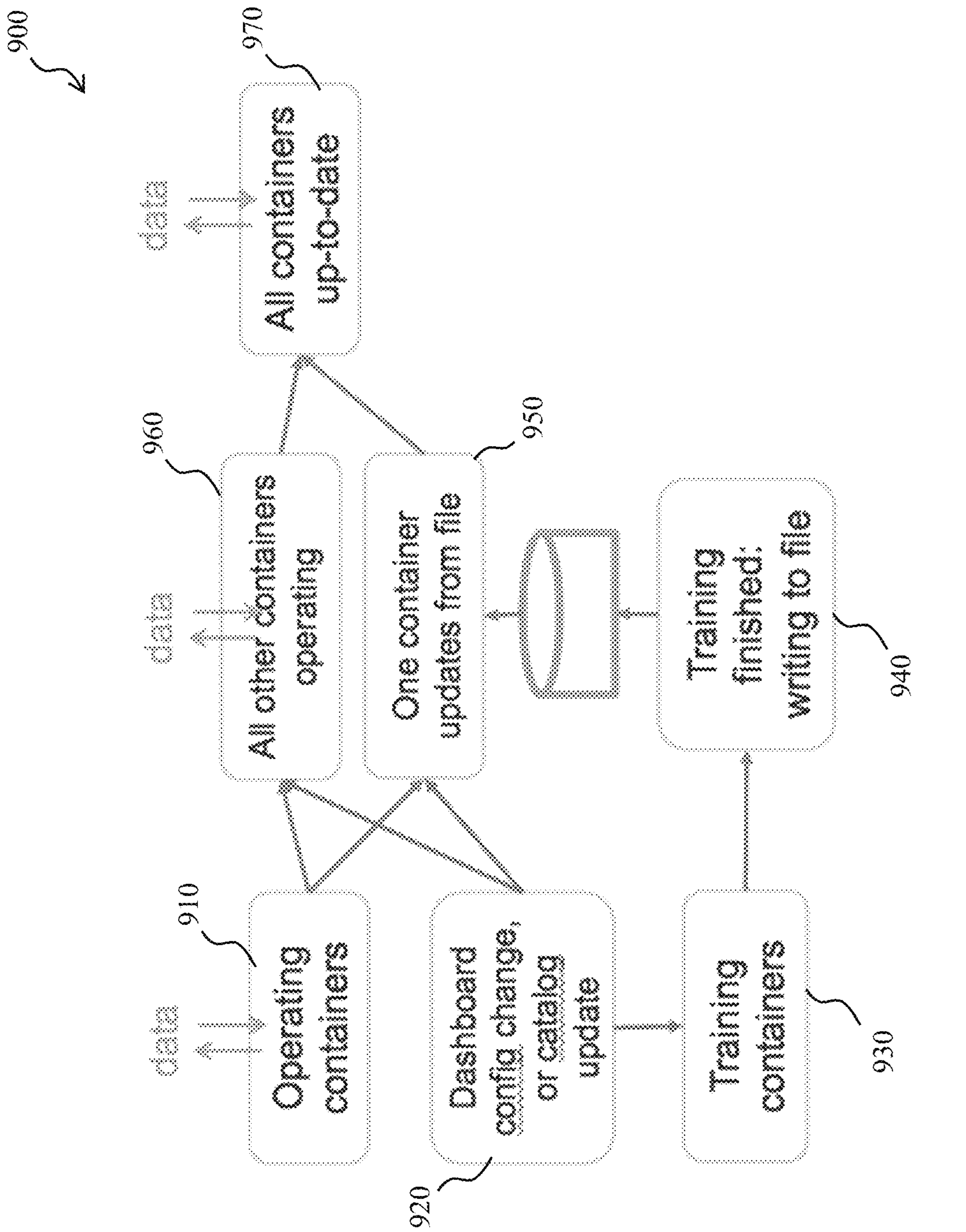
FIG. 9 illustrates further aspects of the exemplary training process utilized by the training engine in accordance with at least one aspect of the invention.

FIG. 8-9 illustrate an exemplary training processes. In general, the recommendation engine 230 answers requests in real-time, but periodically refreshes its configuration with models 810, 812 output by the computation of training engine 240.

An exemplary periodic refreshing of the models is illustrated graphically via process 800. As shown, the current models 810 are utilized to respond to requests for recommendations in accordance with the principles discussed herein. In parallel, the current models 810 are stored in a database 842 from which they are accessed by the training engine 230 for updating via the training process 820. Updated models 812 calculated by the training process 820 are read into the systems' memories 844, replacing the current models 810. The updated models 812 are then utilized by the system to respond to requests for recommendations.

The model update may be performed without any service interruption of the recommendation engine 230 via the use of containers. FIG. 9 illustrates an exemplary training process 900 utilizing containers.

In general, the base infrastructure, i.e., the recommendation process, operates utilizing a plurality of containers (e.g., two to four containers) and the current models 810 (block 910). At this time, the system may be reconfigured (e.g., product catalogs may be updated) such that updating the models may be warranted (block 920). While the base infrastructure is operating to make recommendations utilizing the current models 180, additional containers, i.e., training containers, are launched wherein the updated models 812 are generated (block 930) and written to file (block 940). As the new models 812 are available they start receiving requests in containers utilizing the new models 812 (block 950), while a portion of the containers continue to process requests utilize the old models 810 (block 960). These containers are then progressively and gracefully turned off until all the containers are processing requests utilizing the new models 812 (block 970).

This rolling update ensures that all the models are up-to-date in a non-disruptive way: it is run in production without dropping any traffic and the marketer never notices this process.

Channel-Specific Rendering:

Returning to FIG. 2, the channel-specific rendering module 250 is configured to create the online content, namely, graphical representations of the recommended products (or the pre-selected products to recommended users). The graphics may be generated depending on the channel in which the recommended product will be displayed. This is sometimes referred to herein as the recommendation block 260.

While the aspects of the system described above are similar no matter which content vehicle or channel (e.g., email, webpage, mobile push, etc.) is used for the communication, the system graphically renders product recommendations differently among the various channels.

For a website the channel-specific rendering module renders the graphics via an iframe, HTML code directly inserted inside the page, or via API calls. In the latter case the rendering is completely managed by the marketer, often in the backend (inside the Content Management System, as the page is generated). The use of iframes allows the system to insert product recommendations easily while keeping a high level of security. In particular, the content of the iframe will have no impact on the parent page. The iframes are responsive and will adapt to screen size. The appearance will be identical to the parent page (fonts, colors, image sizes, etc.) as all these properties can be configured and fine-tuned by the marketer to look exactly like the parent page.

For an email, the channel-specific rendering module renders the graphics via a piece of responsive HTML code containing images generated in real-time. These images contain actual product images as well as item properties data (e.g., title, price, etc.). All the system configuration logic applies in this case too as the marketer can select fonts, colors, properties to display, etc.

Exemplary Recommendation Algorithms

Figure 10:
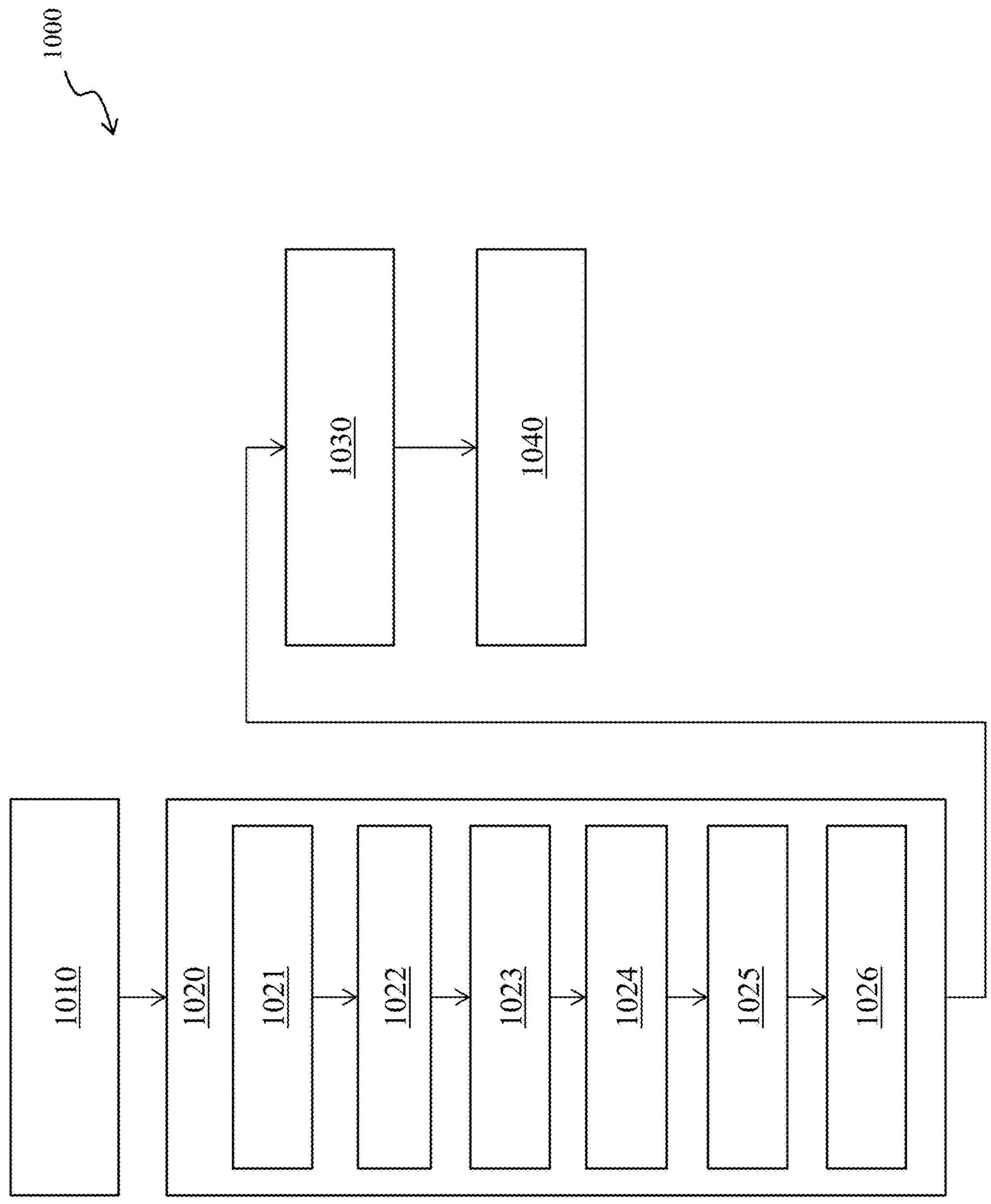
FIG. 10 illustrates an exemplary predictive algorithm utilized by the content recommendation engine in accordance with at least one aspect of the invention.

FIG. 10 illustrates an exemplary algorithm 1000 in accordance with at least one aspect of the invention. The exemplary algorithm provides a personalized recommendation for a user with an action history and contextual data.

At step 1010, the system sets the current list to empty. At step 1020, the system attempts to generate k recommendations from each possible candidate product $c_n$. This involves several sub-steps:

At step 1021, the system calculates a score that is equal to dot-product(<user representation>+<w_context>*<context representation>, <candidate product representation>). The <user representation>, <context representation>, and <candidate product representation> are vectors of floating point (or double-precision floating point) numbers. <w_context> is a scalar value greater than zero, which controls the importance of the context item in the recommendation. If set to 0, the recommendations are completely personalized and are not affected by the context item. If set to much greater than 1, the algorithm is completely dominated by the context and prior user action history is irrelevant. The notation dot(vector1, vector2) refers to a dot-product multiplication between vector1 and vector2. The calculation thus returns a scalar score.

At step 1022, the system compares the score with the lowest score in the current list and with a preset <lowest allowed score>. The <lowest allowed score> may be used to prevent the system from always returning a recommendation. If the score is lower than either, the current candidate $c_n$ is no longer considered and the process starts again with candidate $c_{n+1}$. If the calculated score is greater than the lowest score in the current list, as well as greater than or equal to a preset lowest allowed score, then the process with additional determinations.

At step 1023, the system checks whether the candidate $c_n$ is the same as <context representation>. If so, the score for candidate $c_n$ is decreased by <penalty1>, which may be set to a value greater than 0 so as to discourage recommending a candidate if the context is equal to the candidate.

At step 1024, the system checks whether the user has already been recommended the candidate c. If so, the score for candidate $c_n$ is decreased by <penalty2>, which may be set to a value greater than 0 so as to prevent repeatedly recommending the same candidates to the same user.

At step 1025, the system checks whether the score for candidate $c_n$ is greater than the lowest score in the list. If so, the filter logic is applied at step 1026. If not, candidate $c_n$ is no longer considered and the process starts again with candidate $c_{n+1}$.

At step 1026, filtering logic is applied via a filter algorithm 1100. If candidate $c_n$ passes the filtering algorithm, the system removes the current worst candidate in the list (i.e., the candidate with the worst score), and replaces it with candidate $c_n$. If not, candidate $c_n$ is no longer considered and the process starts again with candidate $c_{n+1}$.

At step 1030, the system checks whether m greater than k items are in the list, and attempts to generate k−m selections using a fall back algorithm, i.e., a different score calculation, in step 1021, if defined. Any such items are appended to the list.

At step 1040, the system checks whether n less than k items are in the list, and if so, uses manually selected fallback items to complete the list, if defined.

Returning now to step 1021, it will be understood that the score can be determined by any method suitable for computing a score with respect to the user-context-candidate triplet. The following are some alternative examples:

- Return a random score. This algorithm configuration does not take into account the user, the context, nor the candidate, and has the advantage of always returning a different selection of candidates.
- Return a hard-coded score which depends on the context. For an item A, items B, C, and D might be considered "compatible", and only those will have a score superior to <lowest allowed score>. The score computation function is therefore a matrix in which all values are smaller than the <lowest allowed score>, except for the items which are deemed "compatible". This is useful for example for electronics equipment, where some cables might be compatible with only some products. Or car parts which are compatible with only some cars.
- Return a score that depends on the popularity of the candidate. In this case, neither the user nor the context are relevant. The score can be a value that is an exact reflection of the popularity of the item, such as the total number of visits ever received for that candidate, or it can be a stochastic measure of popularity, e.g. sampling could be used to estimate the number of visits received for candidate over e.g. the last week.
- Return a score which is a ratio of two measures computed on the candidate, e.g. the number of purchases divided by the number of visits. This will tend to recommend products that have a high chance of being bought, if they are visited (but might be infrequently visited).
- Return a score which is high for candidates recently visited by the user. This ignores the context. The effect will be to return the list of items most recently visited (or bought, or any other action) by the user.
- Return a score directly depends on a feature of the candidate, such as its date of creation (transformed into an integer): This will recommend the most newly added items (promote items newly added to the catalog). It can also be used in reverse, so as to promote old items.
- Return a score which is high if ANY user recently performed an action on this item. This has the effect of providing a "currently trending" or "currently being visited" algorithm.
- Return a score which depends on the product image. This has the effect of ignoring the user and the context. E.g. a convolutional network or multi-layer perception could output a scalar value for a given image (e.g. how likely the product is to contain a face).
- Return a score which depends on a similarity metric of the product image of the context and the product image of the candidate. The similarity metric could be learned via e.g. Siamese networks, or by more traditional means such as the 12-distance of the pixel vector, or pre-computed features such as SIFT-features.
- Any linear or non-linear function that returns a scalar value for three vectors (user, context, candidate) can be used. Each vector can be of size equal or superior to 0.

Fallback algorithms and fallback items are particularly useful for scoring functions such as the compatibility matrix that are prone to often returning an empty product selection list (the compatibility matrix is often hand-defined and therefore extremely sparse).

In addition, several different scoring functions may be combined as desired. This makes the algorithm very flexible. The following are some examples of combined scoring functions:

- Product Affinity, or "visitor profiled." This algorithm may make suggestions reflecting visitors previous interests/behavior, or recommend an item based on what other customers with similar buying personas are browsing and buying. This algorithm may be configured as follows:
  - a. the score may be computed as the dot-product of a user representation and an item representation (the context has a weight of 0), where the user and item representations are found via low-rank matrix factorization of a sparse user x item matrix containing values where an action (browsing or buying) took place;

b. alternatively, the score may be computed as the dot-product of a user representation and an item representation (the context has a weight of 0), where the user and item representations are found via ranking-based similarity learning of a products x products co-occurrence matrix containing counts of how often users transitioned from one product to another;

c. the score may be computed based on a nearest-neighbor algorithm, where the distance metric is computed either on the users or the items; or d. users may be clustered into "personas," where the score may be the count of how often this item has been visited or bought in that cluster.

Brand Affinity. This algorithm may suggest products from similar brands based on what similar customers have bought. This algorithm may be configured as the user of any of the "product affinity" configurations, with an item filter on the brands of the products.

Best Sellers. This algorithm may display best-selling products based on buying preferences This algorithm may be configured as follows:

a. the score may be computed based on a weighted average of a popularity score of the item, and a "product affinity" score; or b. the score may be computed based on the "product affinity" score, with an additional filter to prevent selecting items that are not very popular.

Last Viewed: This algorithm may encourage returning visitors to re-evaluate previously browsed products by displaying items they last viewed. It may compute the score based on how recently an item as viewed by a user.

Upsells: This algorithm may suggest higher value products related to the product placed in cart/browsed. It may compute the score based on item-item similarity (either the dot-product of the context and candidate representations, or a nearest-neighbor score), and add a filter that prevents selecting items which cost less than the context item.

Cross-Sells: This algorithm may suggest related or complementary product to the one placed in cart/browsed. This algorithm may be configured as follows:

a. the score may be computed based on item-item similarity (either the dot-product of the context and candidate representations, or a nearest-neighbor score); or b. the score may be computed using an "item compatibility matrix" that may be defined by hand.

Stock Shifter: This algorithm may suggest product in order to promote slow moving lines. It may be configured to compute the score as the negative of the ratio of the number of purchases over a given period of time (or over all time).

New In: This algorithm may suggest products with a primary focus on the newest products for site. It may compute the score based on the date of when the item was added to the site.

New In Related To visitor profile: This algorithm may suggest the newest products skewed to match visitor profile. It may be configured to compute the score based on a weighted average of "Product affinity" (or "visitor profiled") and "New In."

Chewing gum: This algorithm may suggest lower value products. Just before a visitor pays for his purchases, the algorithm may suggest cheap items.

Exemplary Filter Algorithm

Figure 11:
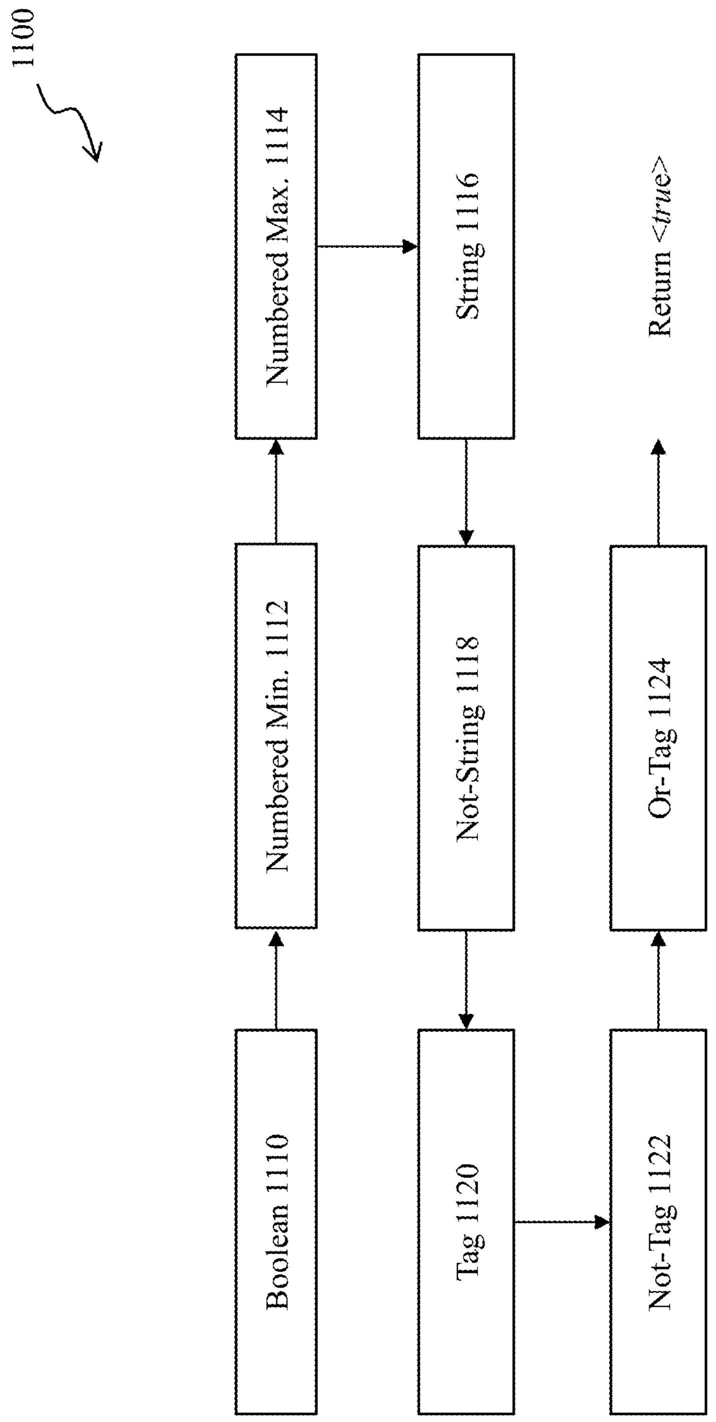
FIG. 11 illustrates an exemplary filtering algorithm utilized by the content recommendation engine in accordance with at least one aspect of the invention.

The aforementioned filter algorithm 1100 will now be discussed with reference to FIG. 11. It will be understood that the data utilized by the filter algorithm includes the selected filters, the candidate product (or user) $c_n$, and the relevant features for candidate $c_n$. The filter algorithm may be as follows:

At step 1110, the system determines whether any Boolean-values features of the candidate pass any Boolean filters. For example, the feature <on sale> may have a Boolean value of either <yes> or <no>. If the filter is passed, continue, else return <false>.

At step 1112, the system determines whether any number-valued features of the candidate pass any minimum value filters. For example, the feature <price> may be subject to a filter that requires its value to be less than 1000. If the filter is passed, continue, else return <false>.

At step 1114, the system determines whether any number-valued features of the candidate pass any maximum value filters. For example, the feature <number of total visits> may be subject to a filter that requires its value to be more than 100. If the filter is passed, continue, else return <false>.

At step 1116, the system determines whether any string-valued features of the candidate pass any string filters. For example, the feature <category> may be subject to a filter that requires its value to be the string "shoes." If the filter is passed, continue, else return <false>.

At step 1118, the system determines whether any string-valued features of the candidate pass any not-string filters. For example, the feature <category> may be subject to a filter that requires that its value not be the string "shoes." If the filter is passed, continue, else return <false>.

At step 1120, the system determines whether any tag features of the candidate pass any tag filters. For example, the feature <tags> may be subject to a filter that requires its value to be "summer." If the filter is passed, continue, else return <false>.

At step 1122, the system determines whether any tag features of the candidate pass any not-tag filters. For example, the feature <tags> may be subject to a filter that requires its value not to be "summer." If the filter is passed, continue, else return <false>.

At step 1124, the system determines whether any tag features of the candidate pass any or-tag filters. For example, the feature <tags> may be subject to a filter that requires its value to be "summer" or be "spring." If the filter is passed, continue, else return <false>.

If there are no further filters, the algorithm returns <true>.

The various filter values may be absolute values (e.g. the price must be inferior to 100) and/or values that are dependent on the context (e.g. the price must be 0.5 times that of the context, or less). In the latter case, the filter values are translated to absolute values before being passed to this algorithm.

It will be understood that candidates in the algorithms can be products or users, depending on whether the algorithm is utilized by the content recommendation module or a user recommendation module.

Other Algorithms

Additional exemplary recommendation algorithms are also contemplated.

In a case where the user has no action history and no contextual data, an alternative recommendation algorithm may be to return a list of predetermined product recommendations. The predetermined list may be predetermined offline in accordance with a given metric, such as the click-through rate for a generic user.

In a case where the user has no action history, but does have contextual data, an alternative recommendation algorithm may be to execute the personalized recommendation algorithm 1000 with the <w_context> value set to much greater than 1. The user representation will not matter much and can be set to the zero vector.

In a case of rendering recommended products non-graphically, the following algorithm may be utilized for allowing the marketer to determine the graphical rendering. An API call to the server may be performed to generate recommendations for a given div id, a given context id and a given user id. The server may then utilize the recommendation algorithms to retrieve k products for recommendation. The server may then retrieve additional item features from the database of the storage device. The server may then return products with features in json format. As used herein, the "div id" is an id property of an html <div> element (e.g. for a div such as <div id="selligent"></div> the div id is "selligent"); the "context id" refers to the item id of the current context (e.g., if a user is on a product page of product A, the context id refers to the item id of item A); and the "user id" is a unique id for a user (e.g., a cookie id or any other kind of online identification).

In a case of rendering recommended products graphically, the following algorithm may be utilized in which no additional programming is required by the marketer. A Javascript tag may call the server with the API call to generate graphical recommendations for a given div id, a given context id and a given user id. The server may then utilize the recommendation algorithms to retrieve k products for recommendation. The server may then retrieve the graphical configuration to be used to render the item selection from the database. The server may then retrieve additional item features from the database. The server may then use the graphical configuration stored in the database to generate an HTML formatted recommendation. The server then may render the HTML in an iframe inside the div with the provided id.

In this manner, the personalized online-content providing system described herein modifies webpage and/or electronic communication content, and/or recipients of the content, such that the content is relevant and personalized to each unique user (i.e., webpage visitor or electronic communication recipient).

The enablements described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

What is claimed is:

1. A server system for providing personalized online-content, the server system including one or more server computers, the server system comprising:

a data-acquisition module implemented via the one or more server computers, the data-acquisition module configured to collect user data and product data;

a configuration module implemented via the one or more server computers, the configuration module configured to determine a predictive algorithm and one or more filters based on received marketer-input wherein the configuration module includes a sentence-based user interface;

a recommendation engine implemented via the one or more server computers, the recommendation engine configured to generate one or more recommendations in real-time, in response to a request, wherein the recommendations are generated via the predictive algorithm, which includes the steps of:

generating scalar scores from the dot-product multiplication of at least one user-vector and at least one product-vector, the user-vector being generated from the user data, the product-vector being generated from the product data, and the scalar score indicating the likelihood that a desired interaction will occur between the at least one user and the at least one product, determining a hierarchical list based on the scalar scores, and applying the one or more filters to the hierarchical list so as to identify the one or more recommendations;

a rendering module implemented via the one or more server computers, the rendering module configured to generate a recommendation block based on the one or more recommendations, wherein the recommendation block is a digital graphical representation of a product; and a network interface connecting the one or more server computers to a network, the network interface configured to transmit the generated recommendation block to a user-computer, coupled to the network, in response to the request.

2. The system of claim 1, wherein the scalar scores are generated from the dot-product multiplication of one user-vector and a plurality of product-vectors such that the hierarchical list is of products, the one or more recommendations are for recommended products, and the recommendation block is generated from the product data associated with the one or more recommended products.

3. The system of claim 2, wherein the hierarchical list is generated by comparing the scalar scores associated with each product.

4. The system of claim 1, wherein the scalar scores are generated from the dot-product multiplication of a plurality of user-vectors and one product-vector such that the hierarchical list is of users, the one or more recommendations are for recommended users, and the recommendation block is generated from the user data associated with the one or more recommended users.

5. The system of claim 4, wherein the hierarchical list is generated by comparing the scalar scores associated with each user.

6. The system of claim 1, wherein the system further comprises:

a training engine configured to determine, independently of the request, the at least one product-vector from the product data, the at least one product-vector being stored in a memory and accessible to the recommendation engine.

7. A method for providing personalized online-content, the method comprising:

collecting user data and product data, via a data-acquisition module of one or more server computers;

determining a predictive algorithm and one or more filters based on received marketer-input, via a configuration module of one or more server computers, wherein the configuration module includes a sentence-based user interface;

receiving a request for one or more recommendations, via a recommendation engine of one or more server computers;

generating one or more recommendations in real-time, via the recommendation engine, in response to the request, wherein the one or more recommendations are generated via the predictive algorithm, which includes the steps of:

generating scalar scores from the dot-product multiplication of at least one user-vector and at least one product-vector, the user-vector being generated from the user data, the product-vector being generated from the product data, and the scalar score indicating the likelihood that a desired interaction will occur between the at least one user and the at least one product, determining a hierarchical list based on the scalar scores, and applying the one or more filters to the hierarchical list so as to identify the one or more recommendations;

generating a recommendation block based on the one or more recommendations, via a rendering module of one or more server computers; and transmitting the generated recommendation block to a user-computer, coupled to a network, in response to the request, via a network interface connecting the one or more server computers to the network.

8. The method of claim 7, wherein the scalar scores are generated from the dot-product multiplication of one user-vector and a plurality of product-vectors such that the hierarchical list is of products, the one or more recommendations are for recommended products, and the recommendation block is generated from the product data associated with the one or more recommended products.

9. The method of claim 8, wherein the hierarchical list is generated by comparing the scalar scores associated with each product.

10. The method of claim 7, wherein the scalar scores are generated from the dot-product multiplication of a plurality of user-vectors and one product-vector such that the hierarchical list is of users, the one or more recommendations are for recommended users, and the recommendation block is generated from the user data associated with the one or more recommended users.

11. The method of claim 10, wherein the hierarchical list is generated by comparing the scalar scores associated with each user.

12. The method of claim 7, wherein the method further comprises: determining, independently of the request, the at least one product-vector from the product data, the at least one product-vector being stored in a memory and accessible to the recommendation engine.

13. A non-transitory computer readable medium having instructions stored thereon, the execution of which by a computer causes the computer to execute a method for providing personalized online-content, the method comprising:

collecting user data and product data, via a data-acquisition module of the computer;

determining a predictive algorithm and one or more filters based on received marketer-input, via a configuration module of the computer, wherein the configuration module includes a sentence-based user interface;

receiving a request for one or more recommendations, via a recommendation engine of the computer;

generating one or more recommendations in real-time, via the recommendation engine, in response to the request, wherein the one or more recommendations are generated via the predictive algorithm, which includes the steps of:

generating scalar scores from the dot-product multiplication of at least one user-vector and at least one product-vector, the user-vector being generated from the user data, the product-vector being generated from the product data, and the scalar score indicating the likelihood that a desired interaction will occur between the at least one user and the at least one product, determining a hierarchical list based on the scalar scores, and applying the one or more filters to the hierarchical list so as to identify the one or more recommendations;

generating a recommendation block based on the one or more recommendations, via a rendering module of the computer, wherein the recommendation block is a digital graphical representation of a product; and transmitting the generated recommendation block to a user-computer, coupled to a network, in response to the request, via a network interface connecting the one or more server computers to the network.

14. The non-transitory computer readable medium of claim 13, wherein the scalar scores are generated from the dot-product multiplication of one user-vector and a plurality of product-vectors such that the hierarchical list is of products, the one or more recommendations are for recommended products, and the recommendation block is generated from the product data associated with the one or more recommended products.

15. The non-transitory computer readable medium of claim 14, wherein the hierarchical list is generated by comparing the scalar scores associated with each product.

16. The non-transitory computer readable medium of claim 13, wherein the scalar scores are generated from the dot-product multiplication of a plurality of user-vectors and one product-vector such that the hierarchical list is of users, the one or more recommendations are for recommended users, and the recommendation block is generated from the user data associated with the one or more recommended users.

17. The non-transitory computer readable medium of claim 16, wherein the hierarchical list is generated by comparing the scalar scores associated with each user.

18. The non-transitory computer readable medium of claim 13, wherein the method further comprises:

determining, independently of the request, the at least one product-vector from the product data, the at least one product-vector being stored in a memory and accessible to the recommendation engine.

* * * * *